Nov. 20, 1951  F. H. REICHEL ET AL  2,575,467
PROCESS AND APPARATUS FOR STUFFING CASINGS
Filed May 14, 1946  3 Sheets-Sheet 1
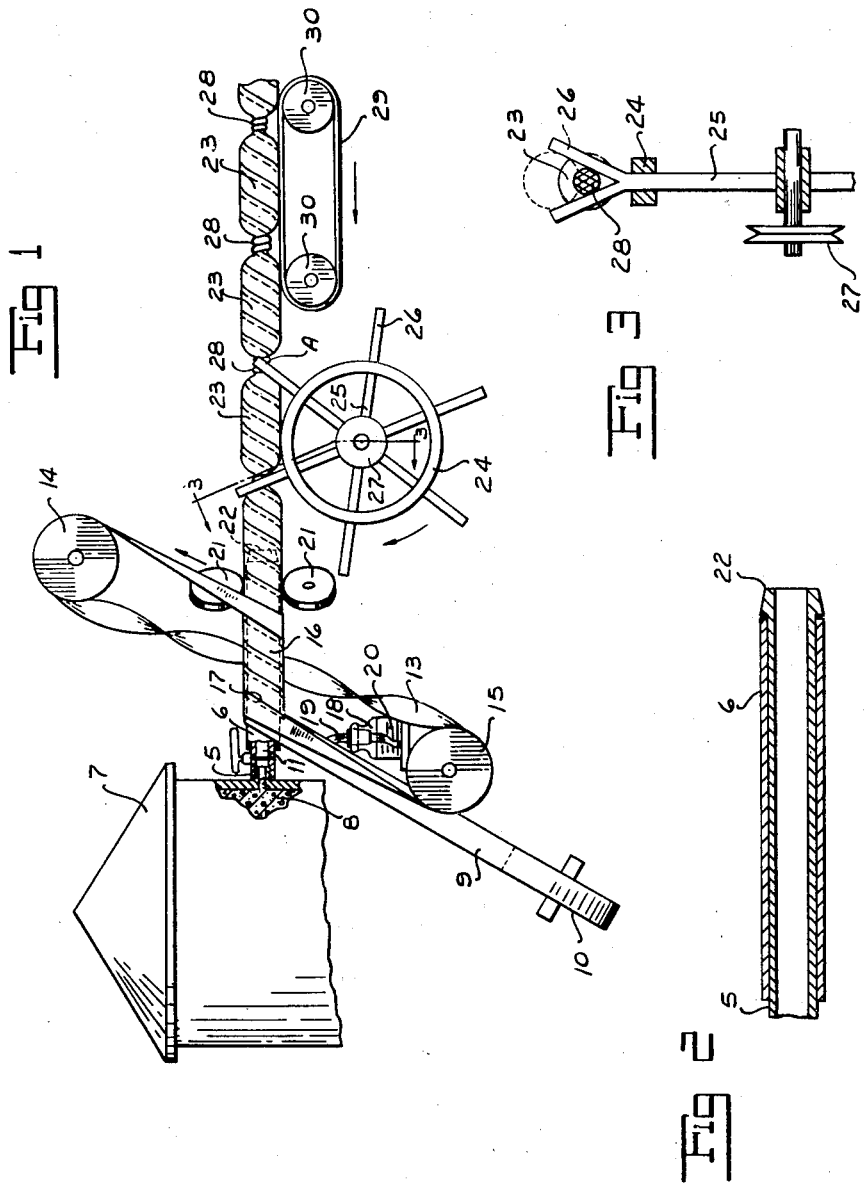
INVENTOR
FRANK H. REICHEL &
CLARENCE L. HARDER
BY John Robert Jones
ATTORNEY Nov. 20, 1951   F. H. REICHEL ET AL   2,575,467
PROCESS AND APPARATUS FOR STUFFING CASINGS
Filed May 14, 1946   3 Sheets-Sheet 2
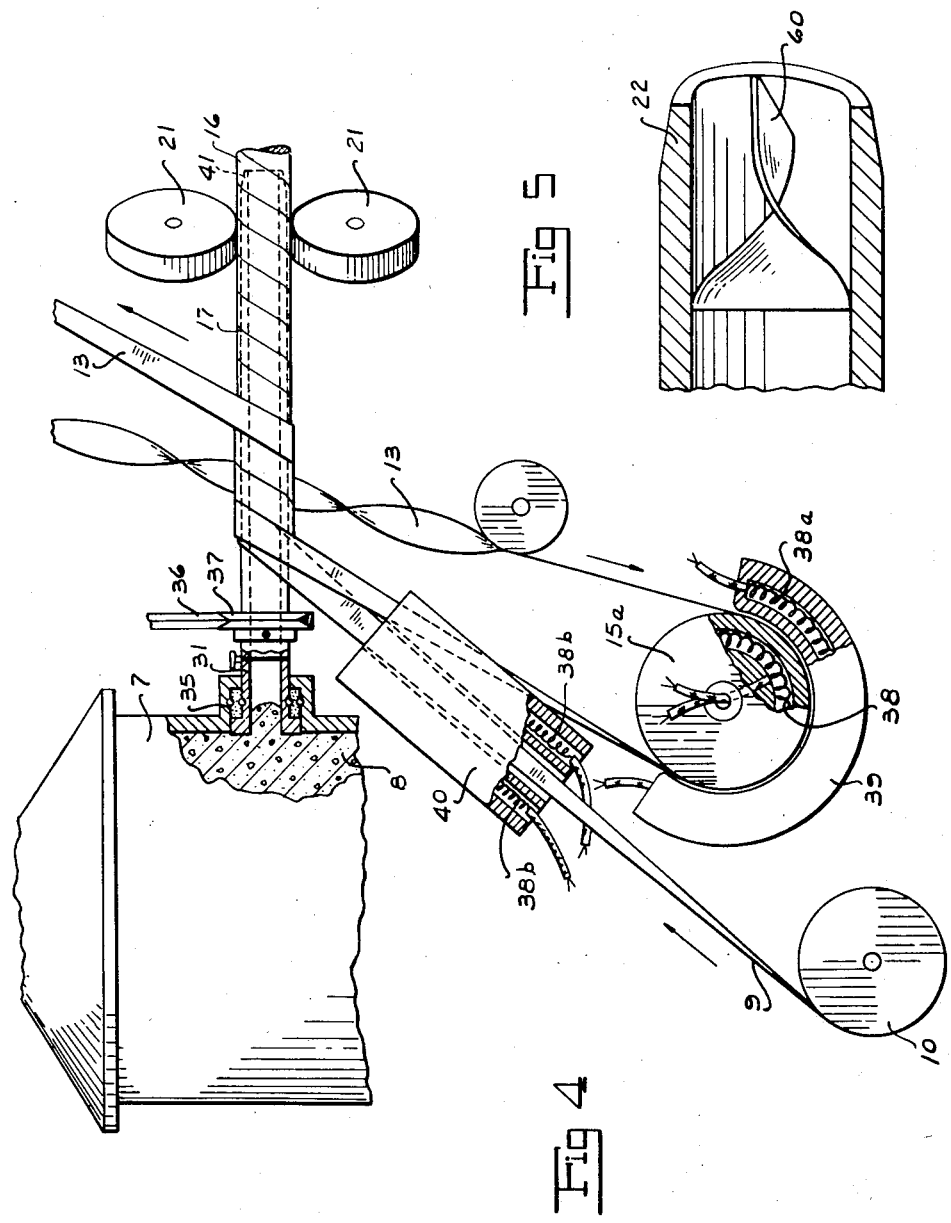
INVENTOR
FRANK H. REICHEL &
CLARENCE L. HARDER
BY John Robert Jones
ATTORNEY

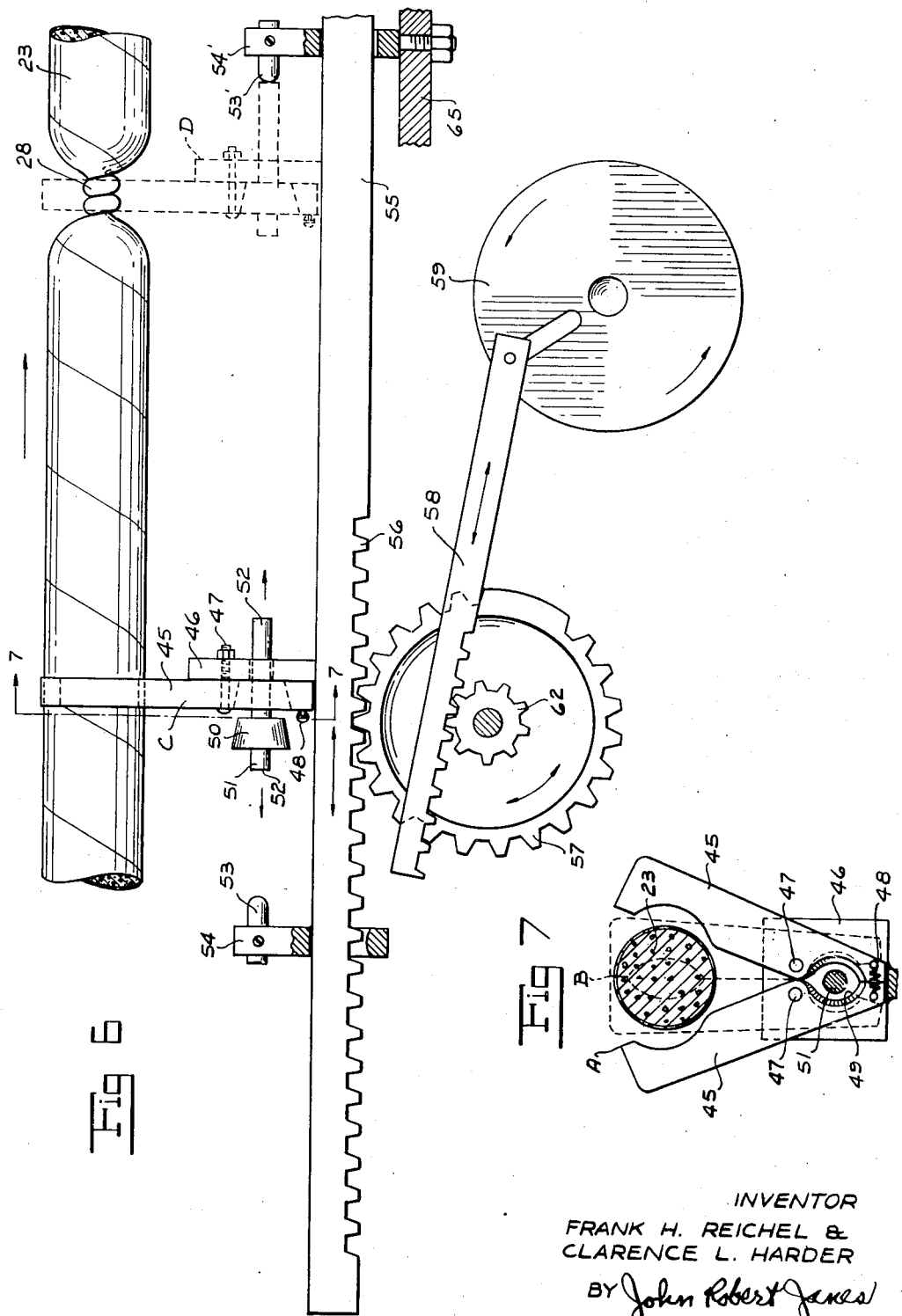

Patented Nov. 20, 1951

2,575,467

UNITED STATES PATENT OFFICE 2,575,467

PROCESS AND APPARATUS FOR STUFFING CASINGS

Frank H. Reichel and Clarence L. Harder, Fredericksburg, Va., assignors, by mesne assignments, to American Viscose Corporation, Wilmington, Del., a corporation of Delaware Application May 14, 1946, Serial No. 669,641

10 Claims. (Cl. 99—176)

This invention relates to a process for the preparation of casings having a helical seam and more particularly to a process for stuffing helically wound casings simultaneously with their preparation.

Helically wound casings are formed by coiling a strip of sealable sheet material in helical form while overlapping adjacent edges of the helices. The overlapping edges are then sealed.

This type of casing has not in the past found extensive commercial application. Casings now principally used by the trade are formed by extrusion of a solution of the material and are seamless. Helically wound casings are more difficult to prepare than seamless casings and, since they require the use of an adhesive to seal the edges of the spirals together, are more expensive. Because of the presence of a seam, helically wound casings have a higher tendency to rupture during stuffing than seamless casings. Since such helically wound casings as have been prepared have been used in the same way as seamless casings, that is, have been prepared by a casing manufacturer and then sent to a meat processer to be stuffed, there has been little or no advantage in their use in place of seamless casings.

Moreover, helically wound casings formed of non-fibrous cellulosic material have shown an objectionable tendency to stretch excessively during stuffing. This stretch may be counteracted in seamless casings by using a casing of normally small diameter, and then stretching it prior to stuffing to the diameter required by the stuffing machine. This, however, cannot be done with helically wound casings since the strips spiral at an angle to the length of the casing and thus stretch unevenly whether the casing is subjected to transverse or longitudinal tension.

Now in accordance with this invention helically wound casings are for the first time used to their full advantage. A strip of sealable material is formed into a casing and the casing stuffed with plastic material concurrently with its formation. Excessive stretching of the helically wound casing is prevented by stretching the strip material employed in its formation prior to winding helically to form the casing.

The process and apparatus of the invention are shown in the attached drawing.

Figure 1 represents a side elevation partly in section of one embodiment of the apparatus of the invention.

Figure 2 represents a detailed view in section of the mandrel and sleeve of Figure 1.

Figure 3 represents an end elevation partly in section of the sausage linking device of Figure 1 taken along the line 3—3.

Figure 4 represents a side elevation partly in section of another embodiment of the apparatus of the invention.

Figure 5 is a cross-section of a stuffing horn or mandrel in accordance with the invention.

Figure 6 is a side elevation of a sausage linking apparatus in accordance with the invention.

Figure 7 is a section of the sausage linking apparatus of Figure 6 taken along the line 7—7.

The apparatus of Figure 1 features a hollow cylindrical mandrel 5 which serves as a stuffing horn. The mandrel 5 is enclosed in a tubular sleeve 6 adapted to rotate upon it. The mandrel 5 is integral with or affixed to the container 7 which is adapted to hold any plastic material 8 stuffed into the casing, such as sausage meat. Suitable impeller means (not shown) are provided in the container 7 to force the plastic material through the mandrel 5.

The helically wound casing is formed by winding a strip 9 of sealable material carried on the roll 10 about the sleeve 6. This is accomplished through use of the continuous or winding belt 13, which winds helically about the sleeve 6, then over the power driven roll 14, past the sleeve 6, unspiralling in the process, and finally around the roll 15 into contact with the strip 9. The belt coils the strip 9 into a helically wound casing 16. The angle which the edge of the strip 9 makes with respect to the sleeve 6 is so adjusted that adjacent edges of the strip 9 overlap to form the joint 17.

The joints 17 may be sealed in various ways. For this purpose a sealing solvent or adhesive may be employed. The container 18 serves as a reservoir for the sealing liquid. A wick 19 carries the adhesive to the inner side of the strip 9. Preferably, the sealing liquid is a solvent for the strip material, thus rendering its surface tacky and accomplishing formation of an autogenous seal between adjacent strips at the joint.

It is advisable to apply pressure to the joint 17 while the sealing material is still tacky. This is done by the pressure rolls 21, which are set at a slight angle to the sleeve 6 and positioned so as to apply pressure along the helical seam of the casing. The sleeve 6 supports the casing during the application of pressure.

The impulse of the belt 13 upon the sleeve 6 causes it to rotate in the direction in which the belt operates. Thus the casing 16 is also rotating as it slides off the sleeve 6 and the end 22 of the mandrel 5. The plastic material 8 may be given a rotating motion as shown in Figure 5. A curved blade 60 is incorporated at the end 22 of the mandrel 5. The curvature of the blades is so arranged that the plastic material is caused to turn in the same direction as the casing.

The apparatus also includes means for linking the stuffed casing simultaneously with its formation. A rotating wheel 24 is positioned beneath the stuffed casing adjacent the end 22 of the mandrel 5. The wheel carries suitably spaced arms 25, each of which terminates in a pair of fingers 26, forming a V-shaped slot. The width of the fingers 26 is adjusted so as to equal the length of link desired. As the wheel 24 is rotated by means of the driving wheel 27, the V-shaped slot formed by the fingers 26 engages the casing. The distance between the fingers 26 of adjacent arms 25 governs the length of the individual sausages formed and may be adjusted as desired. Friction between the stuffed casing and the fingers 26 prevents rotation of the casing in the notch. Since the stuffed casing at the mandrel side of the wheel is still rotating, a twisted link 28 is formed in the casing at the notch. The linking operation tends to compress the plastic material 8 in each individual sausage 23, thus filling it out to its fullest extent. When the arm 25 has travelled to the point A, formation of the link 28 is complete and the stuffed sausage 23 is released. After this release, the sausage passes over a supporting belt 29 driven by pulleys or rolls 30 in the direction of the arrow.

Figure 4 illustrates a second embodiment of the apparatus in which the mandrel is not provided with a rotatable sleeve as in the apparatus of Figure 1, but is itself rotatable. The mandrel 31 is mounted in a suitable airtight bushing 35 which may be rotated by means of the belt 36 and sprocket 37. The container 7 is filled with plastic material 8 as before which is forced by an impeller (not shown) into the mandrel 31.

The belt 13 winds helically about the mandrel in the same manner as in Figure 1. In this apparatus, however, the belt is specially adapted for use with a heat-sealable strip material. The belt is heated by passing it over the heated drum 15a. The drum is heated by an internally positioned electric coil 38. The other surface of the belt 13 is heated by an arcuate hood 39, heated by a similar electric coil 38a.

The heat-sealable strip material 9 carried on the roll 10 is likewise heated by passage through the chamber 40, which is heated by the coils 38b. The chamber 40 heats the strip 9 to a point at which its surface is tacky. The strip is then wound helically about the rotating mandrel 31, the adjacent edges of the coils overlapping and being sealed together through application of pressure by the belt 13. To insure a firm seal at the joints 17, the rolls 21 are provided. These rolls are positioned so as to apply pressure along the spiral seam of the tube while the tube is still supported on the mandrel 31. As the rotating casing 16 passes off the end 41 of the rotating mandrel, it is stuffed with plastic material 8. Since the mandrel carrying the plastic material is rotating, the plastic material likewise is rotating as it engages the casing. The stuffed casing may then be linked as shown in the apparatus of Figure 1 or as shown in the apparatus of Figure 6.

Figures 6 and 7 illustrate a second embodiment of linking means in accordance with the invention. The apparatus features a pair of clamps 45 adapted at one end to engage between them the stuffed sausage casing 23. The size of the opening between the clamps when in closed position, indicated at B in Figure 7, determines the diameter of the link 28 formed by the apparatus.

The clamps 45 are hinged by means of bolts 47 to a base 46. The base is attached to a reciprocating arm 55. The base may be movably or immovably attached to the arm, as desired. The arm 55 is supported on the platform 65.

The clamps 45 are held in a normally open position by the spring 48 positioned at their base. Between the hinge bolts 47 and the spring 48 the pair of clamps define a tapered socket 49. The socket is adapted to receive a tapered plug 50 which is carried on an axle 51 having flat or concave ends 52. The plug is the means provided for closing the clamps 45. When it is forced into the tapered socket 49, the clamps are moved from the position A to position B shown in Figure 7.

In order to force the plug in and out of the tapered socket 49, the arm 55 is provided with a set of duplicate stops 53 and 53' set in movable bases 54 and 54' respectively. The bases 54 and 54' are capable of being attached at any point along the arm 55. In operation, when the end of the plug axle 52 engages the stop 53, the plug 50 is forced into the tapered socket 49 thus closing the clamps. When the end of the plug axle engages the stop 53', the plug is forced out of the tampered socket. The spring 48 then pulls the clamps apart to the position A.

The arm 55 is provided with a geared edge 56 which engages the rotatable gear 57. The gear 57 is provided with a spur 62. A standard Pitman movement comprising the power wheel 59 and the reciprocating rack gear 58 is used to give reciprocating motion to the gear 57 and the arm 55. The speed of the wheel 59 governs the speed at which the arm 55 reciprocates and also governs the rate at which the clamps 45 follow the casing 23. In operation, the rate of movement of the casing and the clamps are equalized.

In Figure 6 the clamps 45 are shown in the open position as indicated in Figure 7. When the end of the plug axle 52 engages the stop 53, the plug 50 will be forced into the tapered socket 49 thus closing the clamps firmly against the casing 23. Since the casing is rotating at the mandrel side while the clamp forces it to become stationary, a twisted link 28 is formed at the clamp. While the link is being formed, the clamps 45 are following the movement of the casing, carried by the arm 55. By the time the clamps have reached the position D, the link 28 has been completed. At this point the end of the axle 52 engages the stop 53' thus forcing the plug 50 out of the tapered socket 49. The clamps open and the casing is released. The arm 55 then carries the plug back into engagement with the stop 53, and the operation is repeated.

It will be observed that the distance between the stops 53 and 53' governs the length of the individual sausages formed by the apparatus. Likewise, the rate of rotation of the sausage while in the clamp governs the number of twists in the link and also, as a result, the length of the link itself.

In order to compensate for different distances between the stops 53 and 53', a slot is provided in the power wheel 59. The slot permits adjustment in the distance travelled by the reciprocating rack gear 58 in each direction.

Any sheet material which may be rapidly and effectively sealed may be used to form the helically wound casing of the invention. The material may be heat-sealing so that application of heat and pressure results in the formation of a strong seal. The material may be attacked by inorganic or organic solvents in which case the material may be rendered tacky through application of a small amount of a solvent and then sealed to itself by application of pressure. Either of these methods is preferred since they do not require the use of additional expensive adhesives. However, an adhesive composition of a type known to form strong seals with the material employed may be used if desired.

Preferably, the material used is capable of being sealed by use of a solvent. A solvent seal results in a coalescence of the contiguous spiral or coil edges without loss in strength. A solvent sealing is preferred to heat-sealing because application of heat normally results in a decrease in tensile strength in some materials due to embrittlement and loss of plasticizer.

Of the solvent sealable materials, an alkali-soluble, water-insoluble cellulosic material is preferred. Such materials include a carboxy-alkyl cellulose ether and mixed cellulose ethers of this class, cellulose ether-xanthates, cellulose xantho-ethers, cellulose thiourethanes, and cellulose xantho fatty acids.

Suitable solvents for use with these materials include sodium hydroxide, potassium hydroxide, lithium hydroxide, a quaternary ammonium base or strong basis organic amines. To increase the viscosity of the solvent an alkali-soluble water-insoluble cellulose ether may be added. A solution containing approximately 8% sodium hydroxide and approximately 5% of an alkali-soluble water-insoluble cellulose ether such as hydroxy ethyl cellulose is preferred.

In addition to alkali-soluble water-insoluble cellulosic materials, there may be employed other solvent sealable sheet materials such as regenerated cellulose, organic solvent soluble cellulose ethers, cellulose esters such as cellulose acetate, and organic solvent-soluble thermoplastic synthetic resins such as polyvinyl resins, polyacrylic resins and polyethylene.

When regenerated cellulose is used the casing may be sealed by use of tribenzylmethyl ammonium hydroxide or an aqueous solution containing 10% sodium hydroxide and 8% alkali-soluble water-insoluble ether. When cellulose acetate or a copolymer of vinyl chloride and vinyl acetate are employed, acetone may be used as the sealing solvent. Ethyl acetate is useful as the sealing solvent with organic solvent-soluble ethyl cellulose.

The casing may also be formed of thermoplastic heat sealable material such as thermoplastic cellulose ethers, thermoplastic cellulose esters, and thermoplastic synthetic resins. Of the latter, copolymers of vinyl chloride, vinylidene chloride, polyamides and chlorinated rubber are preferred.

In order to permit continuous and rapid production of the stuffed casing, the sealing means for any particular sheet material must be one which produces immediately a strong seam, preferably an autogenous seal of the contiguous layers of sheet material. Thus if an adhesive composition is employed, it must be rapidly setting. If a solvent is employed, it must be highly volatile in order to avoid contamination of the plastic material stuffed into the casing. It will be understood that the mandrel and the sleeve contacting the strip material used to form the casing are properly lubricated so as to prevent adhesion to the casing during the sealing operation.

In order to prevent undue stretching of non-fibrous plastic material, it is preferred to stretch the sheet material longitudinally prior to formation of the casing. This may be accomplished by stretching the non-fibrous material while wet, drying the longitudinally stretched strip while under tension, and then helically winding the strip to form a casing. It is not necessary to prestretch the film transversely since the helically wound casing shows no appreciable expansion after a longitudinal prestretching. The stretching operation thus differs from that applied to seamless casings in which it is necessary to prestretch the material both transversely and longitudinally prior to stuffing.

The web of casing material may contain reinforcing fibers. For example, a multiplicity of loose natural or artificial short fibres may be dispersed in a solution of the alkali-soluble water-insoluble cellulose material and the solution formed into a web. Alternatively, a thin tissue paper formed of natural or artificial fibres may be impregnated and coated with a solution of the alkali-soluble water-insoluble cellulosic material which is coagulated by treatment with an acid, washed, and dried. The presence of the loose fibres or of the tissue paper does not interfere with the sealing of the sheet material by the alkaline adhesive. The casings containing fibres are stronger, less expansible, and more opaque. Therefore, such fibrous casings are especially adapted for liver sausage and the like.

The tubing may also be formed of strips of a fibrous sheet material formed by mixing together as by carding or blowing a mixture of non-adhesive fibres, such as cotton or rayon fibres, with potentially adhesive binder fibres, such as thermoplastic fibres formed of synthetic resins and organic cellulose derivatives, the layer of fibres being bonded together by rendering the binder fibres adhesive by heat and pressure. If the quantity of binder fibres is more than 25 per cent, or if the binder fibres are restricted to substantially the surface of the fibrous layer, the fibrous sheet material will be heat-sealable. Therefore, the strip of fibrous material is helically wound into a tube about the stuffer horn and the helical seam heat-sealed thereon.

The sheet material may also be preprinted before being formed into tubing, and since the casing material may be printed in sheet form, considerable economies can be achieved in the cost of printing, since the printing may be applied to a roll of full mill width and the printed roll then slit into strips of the width required to form casings. When the printing is applied on the outside, the ink may be any conventional ink which will adhere to the casing during the operations of stuffing, cooking, and curing, and which will be resistant to the action of grease, smoke, and water. However, unlike the seamless tubing heretofore used, the present seamed casing may be preprinted and folded so that the printing is located on the inner surface of the casing and is viewed through the transparent casing. In this case, it may be desired to employ an ink comprising an approved fat-soluble food dye which will transfer from the inner walls of the casing to the surface of the meat stuffed therein, so that the meat will bear the printing after the casing has been stripped from the sausage. There is thus provided for the first time a "skinless" sausage bearing printing or other indicia.

It is noted that when the seamed casing is used on "skinless" sausages, the presence or absence of a seam is immaterial since the casing is removed before the sausage is sold. If the sausage is to be sold in its casing, the seam does not detract from the appearance because the seam is transparent.

Having described our invention, what we claim as new and desire to secure by Letters Patent is:

1. A process for the manufacture of a helically wound stuffed sausage casing which comprises continuously helically winding a strip material so that the edges of adjacent coils overlap, continuously sealing the overlapping edges to form a sausage casing, continuously stuffing said casing with sausage concurrently with its formation, and intermittently forming links in the stuffed casing at spaced intervals to divide it into individual sections concurrently with its stuffing.

2. A process in accordance with claim 1 in which the winding is performed by rotating the overlapped convolutions about the axis of the helix, the sausage is fed axially into the formed casing in the direction of formation, and the stuffed casing is squeezed and prevented from rotating at intervals beyond the stuffing position.

3. A process in accordance with claim 1, in which the adjacent edges are sealed by use of a solvent for the strip material.

4. A process in accordance with claim 1 in which the overlapping edges are sealed by heat and pressure.

5. A process in accordance with claim 1 in which the overlapping edges are sealed through use of an adhesive.

6. A process for the manufacture of a helically wound stuffed sausage casing which includes longitudinally stretching a strip of non-fibrous cellulosic material, drying said longitudinally stretched strip while under tension, continuously helically winding the strip material so that the edges of adjacent coils overlap, continuously sealing the overlapping edges to form a casing, and continuously stuffing said casing with sausage concurrently with its formation.

7. A process for the manufacture of a helically wound stuffed sausage casing which comprises continuously helically winding a non-fibrous regenerated cellulosic strip material to form a sausage casing therefrom, continuously stuffing said casing with sausage, and intermittently linking said stuffed casing into individual sections concurrently with its formation.

8. An apparatus for simultaneously forming and stuffing casing which comprises a hollow rotatable mandrel, means adjacent one end of the mandrel for introducing a plastic material into said one end of the mandrel, a nozzle at the other end of the mandrel for discharging the plastic material, means adjacent the mandrel for supplying thereto a strip material to be formed into a casing, belt means having a portion thereof extending helically about the mandrel and adapted to receive the strip material from the supply thereof and wrap such strip material in a helical manner about the mandrel with adjacent edges overlapping, means adjacent the mandrel beyond the portion thereof surrounded by the belt means for pressing the overlapped edges against the mandrel and for sealing the overlapped edges, and means for continuously driving the belt means.

9. An apparatus for simultaneously forming and stuffing casings which comprises, in combination, a hollow mandrel comprising a hollow rotatable tube having an exterior surface adapted to serve as a casing-forming surface and to impart rotary motion to said casing as it is formed, means adjacent the mandrel for helically winding sealable strip material about said casing-forming surface, means adjacent the casing-forming surface of the rotatable tube beyond the winding means for pressing said strip material against the casing-forming surface and for sealing said strip material while supported on said surface to form a casing, and means operatively associated with the mandrel for forcing plastic material through the mandrel into said rotating casing.

10. An apparatus for simultaneously forming and stuffing casings which comprises, in combination, a stationary hollow tube and a hollow tube rotatable upon the stationary tube, said rotatable tube having an exterior surface adapted to serve as a casing-forming surface and to impart rotary motion to said casing as it is formed, means adjacent the mandrel for helically winding sealable strip material about said casing-forming surface, means adjacent the casing-forming surface of the rotatable tube beyond the winding means for pressing said strip material against the casing-forming surface and for sealing said strip material while supported on said surface to form a casing, and means operatively associated with the mandrel for forcing plastic material through the mandrel into said rotating casing.

FRANK H. REICHEL.
CLARENCE L. HARDER.

REFERENCES CITED

The following references are of record in the file of this patent:

UNITED STATES PATENTS

| Number | Name | Date |
| --- | --- | --- |
| 1,442,232 | Neuberth | Jan. 16, 1923 |
| 1,610,008 | Hirsch | Dec. 7, 1926 |
| 1,790,868 | Knoll | Feb. 3, 1931 |
| 1,944,970 | Dieffenbach | Jan. 30, 1934 |
| 1,978,774 | Voss et al. | Oct. 30, 1934 |
| 2,042,644 | Walter | June 2, 1936 |
| 2,046,541 | Becker | July 7, 1936 |
| 2,051,922 | Vogt | Aug. 25, 1936 |
| 2,096,221 | Atkinson | Oct. 19, 1937 |
| 2,136,566 | Schnecko et al. | Nov. 15, 1938 |